United States Patent [19]

Vitta et al.

[11] Patent Number: 4,870,552

[45] Date of Patent: Sep. 26, 1989

[54] LIGHTING DEVIVE

[75] Inventors: Michael Vitta, Salem, N.H.; Carl Pennor, Methuen, Mass.

[73] Assignee: Vitta Trust, c/o Michael F. Vitta, Trustee, Salem, N.H.

[21] Appl. No.: 222,849

[22] Filed: Jul. 22, 1988

[51] Int. Cl.⁴ .......................... B60Q 1/00; F21V 15/04

[52] U.S. Cl. .................................... 362/369; 362/390; 248/603

[58] Field of Search ............... 362/369, 390, 261, 416, 362/306; 248/603, 604

[56] References Cited

U.S. PATENT DOCUMENTS

| | | | |
|---|---|---|---|
| 241,112 | 5/1881 | Woolley | 362/390 X |
| 558,669 | 4/1896 | Woodman | 362/369 X |
| 1,435,763 | 11/1922 | Townsend | 248/603 X |
| 1,495,287 | 5/1924 | Wilson | 362/369 X |
| 1,502,866 | 7/1924 | Moore | 362/369 X |
| 1,536,407 | 5/1925 | Pettus | 362/369 X |
| 1,786,758 | 12/1930 | Larson | 362/390 |
| 4,482,125 | 11/1984 | Ziernicki | 362/369 X |

FOREIGN PATENT DOCUMENTS

| | | | |
|---|---|---|---|
| 161772 | 4/1921 | United Kingdom | 362/369 |

*Primary Examiner*—Ira S. Lazarus
*Assistant Examiner*—Peggy Neils
*Attorney, Agent, or Firm*—Edward A. Gordon

[57] ABSTRACT

A shock absorbing lighting device is provided which includes first and second end members each having an inner surface, an outer surface, and a peripheral edge. The first and second end members are held in spaced relationship by a plurality of elongated support members disposed in spaced relationship about the inner surfaces of the end members and adjacent to the peripheral edges of the end members to form a frame structure within which a light member is disposed. The light member is supported within the frame structure by resiliently urged hook members adapted to minimize transfer of shock from the frame structure to the light member. The first and second end members have corresponding polygonal configurations so that the lighting device when in the horizontal position resting on the peripheral edges of the end members can be rotated to selected positions for directing the light member and when in a generally vertical position resting on one of the end members can be rotated about its vertical axis to selected positions for directing the light member.

12 Claims, 4 Drawing Sheets

LIGHTING DEVIVE

BACKGROUND OF THE INVENTION

1. Field Of The Invention

The present invention relates to lighting devices and more particularly to a new and improved shock absorbing lighting device to prevent or minimize damage to the contained lighting unit such as an arc lamp and which can be rotated to desired positions for directing the light beam.

2. Description Of The Prior Art

Lighting units such as lamp bulbs and arc lamps are subject to significant shocks when portable units are employed at construction sites, for example, where the use and environment can subject such lamps to significant shocks or when the lamps are moved over rough or unevent terrain which can also subject such lamps to significant shocks. Such shocks can result in breakage to lamps and bulbs with the result that it is often a difficult and expensive task to replace broken or damaged lamps and bulbs. In the case of lamp bulbs or other articles formed with glass, springs have been connected to the structure, which is used to support such articles, to absorb or dampen any shocks which might be received by the support structure.

U.S. Pat. No. 1,554,501 to Horle et. al. issued September 22, 1925 discloses a vacuum tube support structure in which a horizontal mounting of the vacuum tubes is provided by two oblique springs located at each of the four corners of the vacuum tube support structure and which extend to an outside framework.

U.S. Pat. No. 1,643,925 to Cooke, Jr. issued September 27, 1927 discloses a traffic signal support structure in which four springs are fastened to the lamp or traffic signal casing. The opposite end of the springs are attached to a base for cushioning the lamp casing and for limiting the swinging movement of the lamp casing.

U.S. Pat. No. 241,112 to L.G. Woolley issued May 3, 1881 discloses an electric lamp-frame which is attached to a support frame by opposing springs.

While such prior art devices provide improvement in the areas intended, such devices still leave much to be desired in the area of portable shock absorbing lighting devices. For instance, they are considerably limited with respect to simplicity of construction, versatility of use, and ability to absorb components of shock from all directions including horizontal, vertical, and angular to thereby prevent or at least minimize damage to the lighting unit.

Accordingly, a principal desirable object of the present invention is to provide a new and improved shock absorbing lighting device.

Another desirable object of the present invention is to provide a novel shock absorbing lighting device which is structurally distinct from prior art devices.

Another desirable object of the present invention is to provide a shock absorbing lighting device which is of simple, practical, and economic construction.

A still further desirable object of the present invention is to provide a lighting device of the above desirable objects which provides novel versatility in light beam direction.

These and other desirable objects of the invention will in part appear hereinafter and will in part become apparent after consideration of the specification with reference to the accompanying drawings and the claims.

SUMMARY OF THE INVENTION

In accordance with the present invention, a shock absorbing lighting device is provided which includes first and second end members each having an inner surface, an outer surface, and a peripheral edge. The first and second end members are held in spaced relationship by a plurality of elongated support members disposed in spaced relationship about the inner surfaces of the end members and adjacent to the peripheral edges of the end members. The end members and the elongated spaced members form a frame structure within which a light member is disposed. The light member is supported within the frame structure by resiliently urged hook members adapted to minimize transfer of shock from the frame structure to the light member. The first and second end members have a polygonal configuration so that the lighting device when in the horizontal position resting on the peripheral edges of the end members, can be rotated to selected positions for directing the light member. Similarly when the lighting device is in a generally vertical position resting on one of the end members the lighting device can be rotated about its vertical axis to selected positions for directing the light member. The light member can be connected to an external power source via a power cable or can be provided with a self contained power source.

BRIEF DESCRIPTION OF THE DRAWINGS

For a fuller understanding of the nature and desired objects of the present invention, reference should be made to the following detailed description taken in conjunction with the accompanying drawings wherein like reference characters denote corresponding parts throughout several views and wherein.

DETAILED DESCRIPTION OF PREFERRED EMBODIMENT(S)

Figure 1:
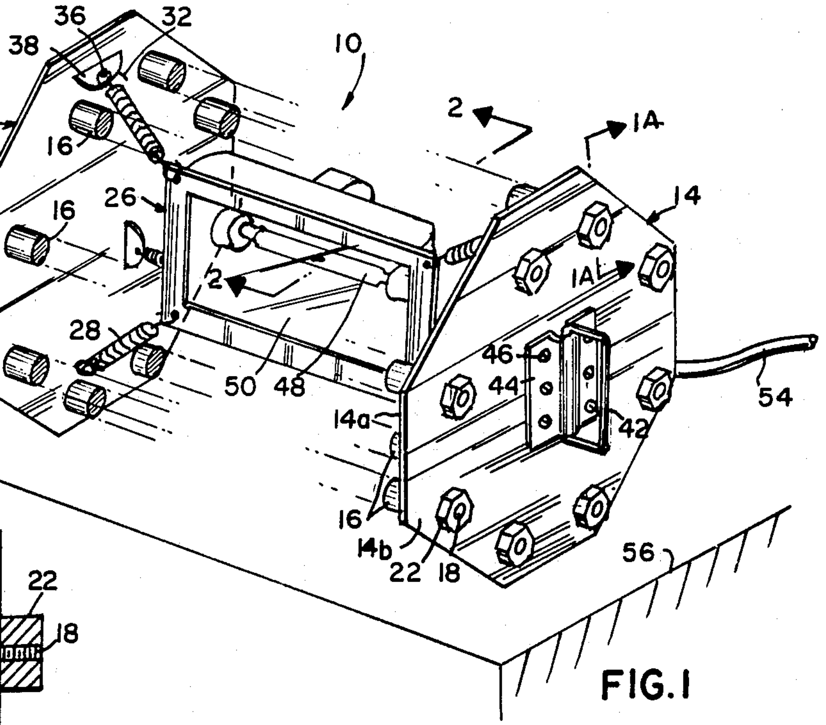
FIG. 1 is a perspective, partly in phantom, of a shock absorbing lighting device in accordance with the present invention.
Figure 2:
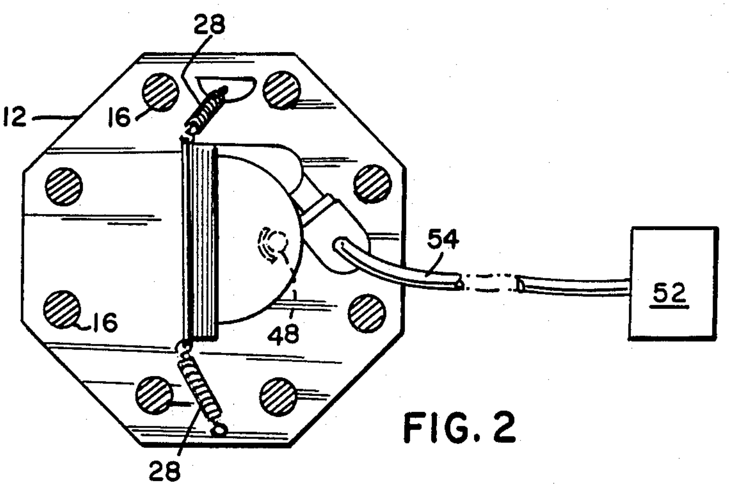
FIG. 2 is a cross-sectional view taken along the line 2—2 of FIG. 1.
Figure 3:
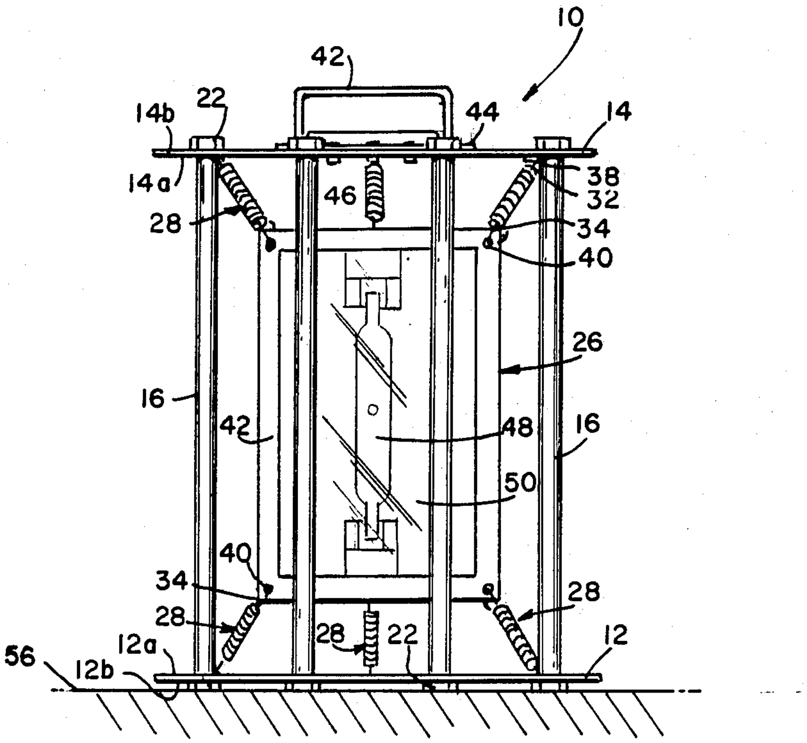
FIG. 3 is a front elevational view of the lighting device of FIG. 1.

Referring now to the drawings and more particularly to FIGS. 1—3, there is illustrated generally by the numeral 10 a shock absorbing lighting device in accordance with the present inveniton. The lighting device 10 includes a first end member 12 and a second end member 14 each a mirror image of each other and having inner surfaces 12*a* and 14*a* and outer surfaces 12b and 14b respectively.

Figure 1A:
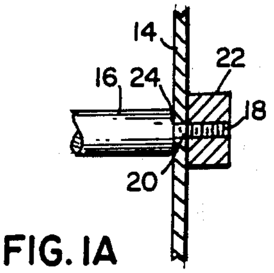
FIG. 1A is a fragmentary sectional view along the line 1A—1A of FIG. 1.

The end members 12 and 14 are held in spaced relationship by a plurality of elongated support members 16. Opposing ends of each support member 16 are attached to the end members 12 and 14. As best seen in FIG. 1A the support members 16 are provided with threaded end portions 18, which are of smaller diameter than the main body 16, and are inserted through the apertures 20 in the end members (14 for example) and secured in position by an internally threaded mating nut member 22 and the flange portion 24 of support member 16.

The end members 12 and 14 and elongated support members 16 form a frame structure within which a light member 26 is disposed.

The light member 26 is supported within the frame structure by resiliently urged hook members 28 which are adapted to minimize transfer of shock from the frame structure to the light structure. The resiliently urged hook member 28 can comprise a coil spring 30 having hook portions 32 and 34. The hook portions 32 are hooked in the apertures 36 in the rib members 38 attached to the inner surfaces 12*a* and 14*a* of the end members. The hook portions 34 are hooked in the apertures 40 provided in the light member housing 42. While it has been found that three resilient hook members forming a triangular configuration at opposing ends of the light member are preferable in absorbing multidirectional components of shock including vertical and horizontal components, it is to be understood a pair of opposing resiliently urged hook members can be employed as well as additional hook members in excess of the opposing three membered groups.

In the preferred embodiment, at least one end member, for example end member 14 of FIG. 1, is provided with a pivotable and foldable handle member 42 which is held in position on the outer surface 14b by plate 44 and bolts 46.

The lamp member 26 can be a conventional quartz lamp i.e. a mercury vapor lamp with a quartz tube 48 and lens 50 as illustrated, powered from an external source 52 via power cord 54. It is to be understood that other light sources such as conventional arc lights and filament light bulbs can be employed as a suitable light member 26. Also the power source can be self-contained by utilizing one or more batteries which are electrically connected and contained within the light member as is well known.

The end members 12 and 14 are provided with a polygonyl configuration so that the lighting device 10 when in the horizontal position resting on the end members on a supporting surface 56 such as the ground or other surface (as shown in FIG. 1) can be rotated to selected positions for directing the light beam 58 of the light member 26.

As best seen in FIGS. 4–7 the polygonyl end members are provided with a peripheral edge 60 of eight sections or sides a–h. As can be appreciated, the lighting device 10 can be rotated in either a left or right direction to the selected position for directing the light beam 58 as illustrated in FIGS. 4–7.

Similarly when the lighting device 10 is in a generally vertical position resting on one of the end members such as illustrated in FIG. 3, the lighting device can be rotated 360° about its vertical axis to selected positions for directing the light member as illustrated in FIGS. 8–11.

Figure 12:
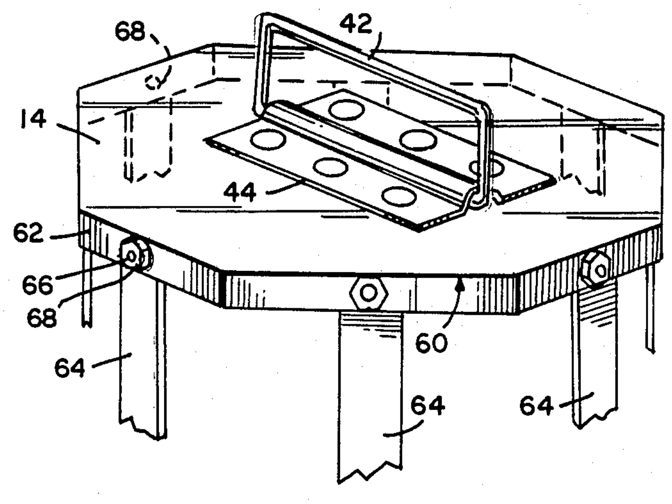
FIG. 12 is a fragmentary perspective view, partly in phantom, of a modified embodiment of the end members and elongated support members in accordace with the present invention.
Figure 4:
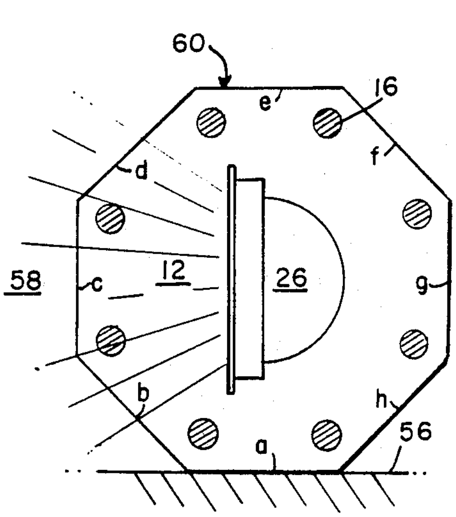
FIGS. 4–7 are end elevational views of the lighting device of FIG. 1 illustrating examples of various selected positions for directing the light member when in a horizontal position on a supporting surface.
Figure 5:
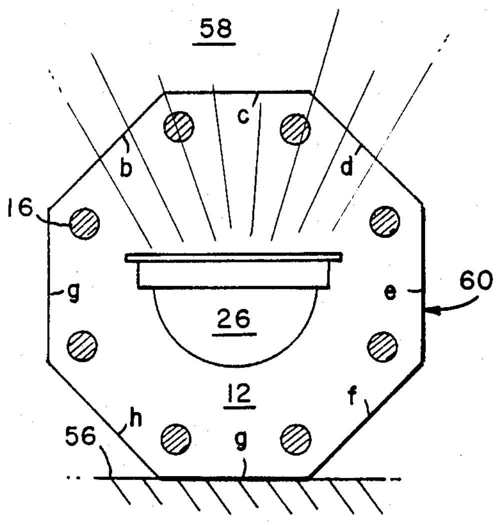
Figure 6:
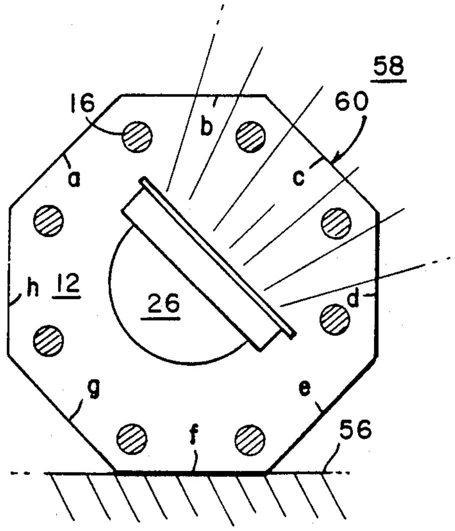
Figure 7:
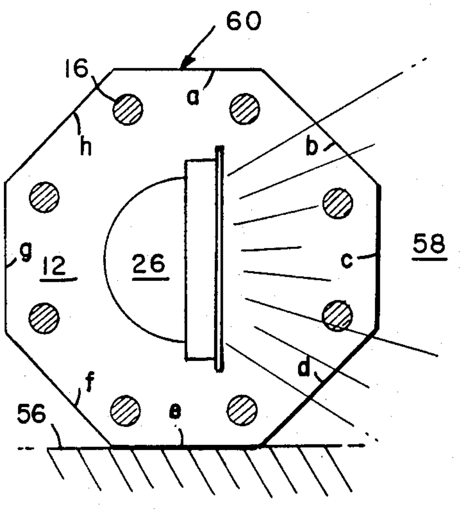
Figure 8:
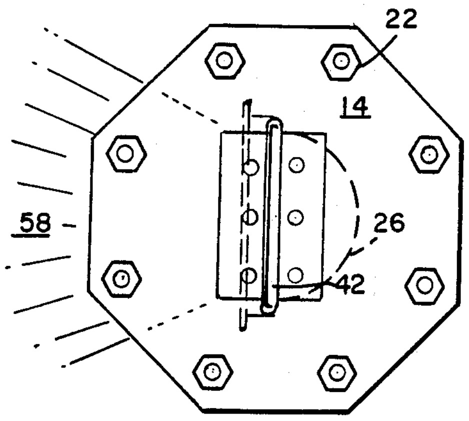
FIGS. 8–11 are end elevational views of the lighting device of FIG. 1 illustrating the various selected positions for directing the light member when in a vertical position on a supporting surface.
Figure 9:
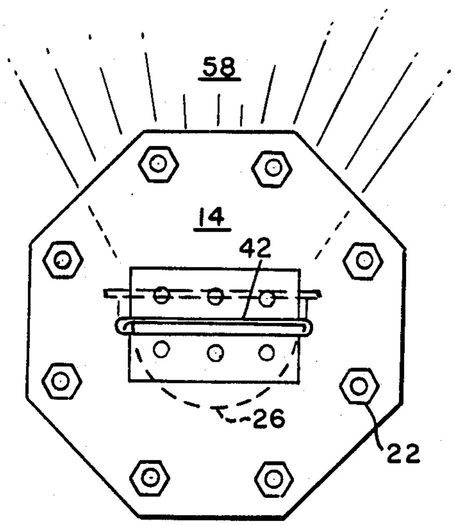
Figure 10:
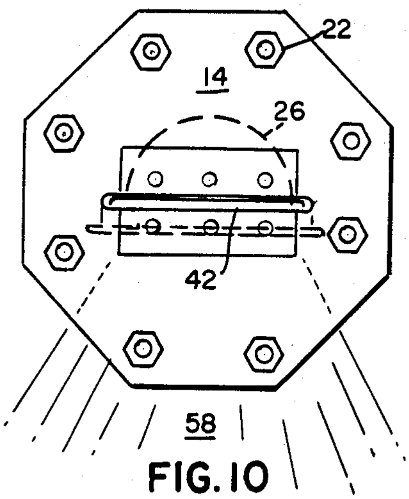
Figure 11:
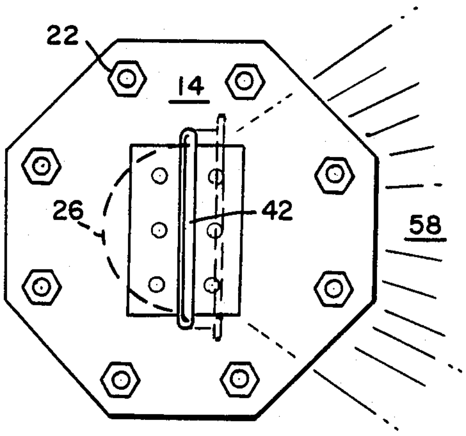

Referring now to FIG. 12, there is illustrated a modified embodiment of the end members and elongated support members. Each end member (14 as shown for example) is provided with a collar member 62 disposed about the inner surface 14*a* of end member 14 adjacent the peripheral edge 60. Elongated support members 64 having a generally rectangular cross-section are preferably attached to the inner surface of collar member 62 by suitable bolts 66 and associated nuts 68.

While the components of the frame structure of the present invention can be fabricated from materials such as metals, plastics, wood and combinations thereof, it has been found that aluminum alloys and stainless steel are suitable.

While the number of sides on the peripheral edges of the end member can be varied within the scope of the invention, it has been found that at least six sides and between six to ten sides are suitable for most uses. Additionally, while the resiliently urged hook members have been described as having a coil spring as the resilient member, the resilient member can be formed of other materials such as a resilient elastomeric material.

While the invention has been described with respect to preferred embodiments, it will be apparent to those skilled in the art that changes and modifications may be made without departing from the scope of the invention herein involved in its broader aspects. Accordingly, it is intended that all matter contained in the above description, or shown in the accompanying drawing shall be interpreted as illustrative and not in limiting sense.

What is claimed is:

1. A shock absorbing lighting device comprising:

first and second end members each having an inner surface, an outer surface, and a peripheral edge surface;

said end members being mirror images of each other and having a polygonyl configuration;

means for holding said first and second end members in spaced relationship;

said end members and said holding means forming a frame structure;e .

light means within said frame structure; and resilient means connecting said light means with said frame structure;

said resilient means permitting limited multidirectional resilientmovement of said light means within said frame structur whereby transfer of multidirectional shock forces applied to said frame structure are absorbed by said resilient means;

said polygonyl configuration of said end members permitting said lighting device to be rotated upon a supporting surface about said peripheral edge surfaces to selected positions for directing said light means.

2. The lighting device of claim 1 wherein said means for supporting said light means comprises at least one pair of resilient means each having one end attached to an inner surface of said one end member and the other end attached to opposing sides of said light means for reducing shock to said light means.

3. A shock absorbing lighting device comprising:

first and second end members each having an inner surface, an outer surface, and a peripheral edge;

a plurality of support members for holding said end members in spaced parallel relationship;

said end members and said support members forming a frame structure;

light means within said frame structure; and resilient means connecting said light means with said frame structure;

said resilient means permitting limited multidirectional resilient movement of said light means within said frame structure whereby transfer of multidirectional shock forces from said frame structure to said light means is reduced;

said peripheral edges of said end members having a plurality of corresponding peripheral edge surfaces whereby said lighting device is rotatable upon a supporting surface to selected peripheral edge positions for directing said light means.

4. The lighting device of claim 3 wherein said end members are polygons.

5. The lighting device of claim 3 wherein said end members are octagons.

6. The lighting device of claim 3 wherein said end members are mirror images of each other and have between 6 to 10 peripheral edge surfaces.

7. The lighting device of claim 3 wherein said end members are adapted to support said lighting device in a generally upright vertical position whereby said lighting device is rotatable about its vertical axis to selected positions for directing said light means.

8. The light device of claim 3 wherein said means for supporting said light means comprises at least one pair of resilient means each having one end attached to an inner surface of said end member and the other end attached to opposing sides of said light means for reducing shock to said light means.

9. The lighting device of claim 8 wherein said resilient means comprises a first hook means for releasable attachment to an inner surface of an end member, a second hook means for releasable attachment to said light means, and spring means attached to said first and second hook means so as to urge said hook means toward one another.

10. The lightng device of claim 3 wherein said means for supporting said light means comprises three pairs of resilient means forming opposing triangular configurations, each pair of resilient means having one end attached to an inner surface of an opposing end member and the other end attached to an opposing side of said light means for reducing shock to said light means.

11. The lighting device of claim 9 wherein said spring means comprises a coil spring member.

12. The lighting device of claim 9 wherein said spring means comprises an elastomeric member.

* * * * *